United States Patent
Busch

[11] 3,890,100
[45] June 17, 1975

[54] GAS CONDITIONING AND ANALYZING SYSTEM

[75] Inventor: Francis R. Busch, Morganhill, Calif.

[73] Assignee: General Electric Company, San Jose, Calif.

[22] Filed: Sept. 28, 1973

[21] Appl. No.: 401,953

[52] U.S. Cl.......... 23/232 E; 23/254 E; 176/19 LD; 176/37
[51] Int. Cl....................... G01n 31/12; G21c 17/00
[58] Field of Search............ 23/232 E, 254 E, 255 E

[56] References Cited
UNITED STATES PATENTS

| | | | |
|---|---|---|---|
| 2,329,459 | 9/1943 | Dickey | 23/232 E |
| 5,340,013 | 9/1967 | Rooney et al. | 23/255 E X |

*Primary Examiner*—Robert M. Reese
*Attorney, Agent, or Firm*—Ivor J. James, Jr.; Samuel E. Turner; Sam E. Laub

[57] ABSTRACT

A gas conditioning and analyzing system for conditioning and analyzing a sample of gas of any given temperature, composition and moisture content. The system receives a sample of gas from a source in a conduit leading to a detection chamber and the detection chamber has a liquid reservoir for conditioning the sample and a detecting unit for gas analysis. Separate gas and liquid outlets from the detection chamber are provided with the gas outlet leading to a flame checking chamber for release of the gas under liquid after which the gas and liquid are passed out of the chamber in a conduit leading to a discharge point. The liquid outlet leads to a liquid level regulator chamber from which the liquid is discharged from the system. The system is able to analyze potentially explosive mixtures of gases in a safe, continuous and rapid manner.

43 Claims, 5 Drawing Figures

GAS CONDITIONING AND ANALYZING SYSTEM

BACKGROUND OF THE INVENTION

Nuclear chain fission reactions and the reactors in which they take place are now commonly used for the production of electrical power. A typical reactor includes a chain reacting assembly or core made up of nuclear fuel material contained in the fuel elements. The fuel material is generally encased in a corrosion-resistant, heat-conductive container or cladding. The reactor core, made up of a plurality of these fuel elements or rods in spaced relationship plus control or blades, incore instrumentation, etc., is enclosed in a container or core shroud through which the reactor coolant flows. As the coolant passes between the spaced fuel rods, it is heated by thermal energy released in the fuel during the fission reaction. The heated coolant then leaves the reactor and the heat energy is used to perform useful work such as driving a turbine-generator set to produce electrical power. The cooled coolant from the turbine-generator is purified by removing any particulate material and non-condensible gases from the coolant and the coolant is recycled back to the reactor.

In boiling water type reactors, the coolant is water with a portion of the water being evaporated in the core. The resulting steam is separated from the water within the reactor vessel and is directed to a load, such as a turbine. After passing through the turbine, the steam is condensed and the condensate is demineralized and treated to remove any particulate material such as corrosion products after which the condensate is returned to the reactor.

Under present commercial practice, the non-condensible gases which are mixed in the stream leaving the turbine are removed in the condenser, held for a suitable period to permit any short-lived fission and activation product gases which may be present in the stream to decay to safe levels, and then the gases (called off-gases) are vented to the atmosphere through a stack. These reactor off-gases primarily consist of air, which has leaked into the system through various flanges and fittings present in the nuclear reactor, and hydrogen and oxygen produced by radiolytic decomposition of water in the reactor core.

In the production of high pressure steam in a boiling water reactor power plant, a small percentage (about 0.007 percent) of the water traversing the radiation field in the reactor is decomposed by radiolysis generating stoichiometric quantities of hydrogen and oxygen. This gas content passes through the power generating turbine along with the steam. In addition, small amounts of radioactive noble gases, such as xenon and krypton, are present in the off-gases. In a typical large reactor system, the total off-gas discharge is about 200 cubic feet per minute (of which about 90 percent is a radiolytically formed stoichiometric mixture of oxygen and hydrogen, and about 10 percent is water vapor, air in-leakage and other gases). Included in the other gases are a few cubic centimeters per minute of fission product gases such as xenon and krypton. Although the amounts (about $10^{16\ 6}$ percent or less by volume) of radioactive isotopes of xenon and krypton are minute, they account for almost all of the radioactivity (about 300 curies per cubic foot) of the off-gases.

It is generally necessary to retain the off-gases for about 30 minutes to permit the xenon and krypton isotopes and the short-lived activation products to decay to safe levels before venting the gases to the atmosphere. This necessary delay requires that large volume of gases containing potentially explosive mixtures of hydrogen and oxygen must be stored for this period of time before venting. Standard practice has been to provide a large volume piping system designed to withstand explosions to hold this gas volume for the required period. For example, such a hold-up pipe may be a few feet in diameter and extend for several hundred feet. This hold-up system is expensive because of its size and the necessity of an explosion-proof design. Thus it would be highly desirable to eliminate the hazards and expense resulting from the need to retain large quantities of explosive gases for appreciable periods of time.

It has been proposed that this volume of off-gas be reduced by recombining the stoichiometric hydrogen-oxygen content of the off-gas to form water which would be condensable. This would both greatly reduce the quantity of gas being stored and remove the danger of an explosion. Attempts have been made to use catalytic recombiners in this manner with one very successful recombiner in the form of an off-gas burner system being disclosed in U.S. Pat. No. 3,598,699 issued Aug. 10, 1971 entitled Nuclear Reactor Off-gas Burner System which patent is assigned to the same assignee as the present invention.

The foregoing recombiner and other recombiners require monitoring of the gas composition preferably both upstream and downstream of the recombiner for a rapid indication of the relative proportions of gases entering and leaving the recombiner. Gas chromatography is currently used for analysis of hydrogen in some of these off-gas burner systems, however, gas chromatography has an inherent disadvantage of requiring a long time for getting an accurate analysis of the gas composition. This long delay in obtaining gas analysis results in a long delay in detecting a recombiner system failure and a longer delay in taking corrective action such as switching to a standby recombiner. Further, this long delay in obtaining gas analysis results in the requirement of appreciable storage space for the gas before it is fed to the recombiner system due to the possibility of recombiner failure. Accordingly, it remains desirable to reduce the time required for furnishing an accurate, rapid gas analysis of the gas stream flowing into and out of the recombiner associated with a nuclear reactor and the nuclear reactor steam supply system to enable monitoring of the current status of the recombiner.

A gas conditioning and analyzing system meeting the foregoing requirements is disclosed in copending U.S. Pat. application Ser. No. 178,113, now U.S. Pat. No. 3,788,813 and this system will now be described in detail by reference to FIG. 1.

Samples of gases are withdrawn from the main process stream in line 37 and drawn in line 38 into the system 40 by the main condenser vacuum (vacuum drawing means) or by an auxiliary vacuum pump (vacuum drawing means) in the absence of sufficient main condenser vacuum.

The process gas samples pass through three-way inlet valve 111 and solenoid shut off valve 115 in line 38. Valve 111 can can be set to receive either the process gas from line 37 or room air from line 112 drawn through filter 114. Valve 115 can be used to stop any gas from being drawn through line 38. The rate of flow of sample gas in line 38 is controlled by a flow indicating controller 116 to a pre-selected flow rate and is passed into sample detection chamber 117 through a sintered porous metal flame arrester (flame arrester means) 47 which is submerged under a body of liquid 48. The arrester 47 disperses the incoming gas into very small bubbles so that it bubbles up through the liquid giving up or absorbing temperature and liquid which is determined by the temperature of the liquid 48 in the detection chamber 117. The bubbling action further serves to condition the sample in that any particulate matter carried in the sample is picked up by the liquid. A preferred liquid 48 is water when the system 40 is set up to analyze the sample for either its hydrogen or oxygen content or both.

Liquid 48 is added to detection chamber 117 in line 93 through valve 91 and flow indicating controller 90 which regulates the flow of liquid to the detection chamber 117 in a controlled manner. This maintains sufficient liquid in detection chamber 117 at desired temperatures to condition the incoming gas sample to the desired temperature and the desired moisture content. In this manner the detection chamber 117 controls the temperature of the gas sample. A means 122 of refrigeration or heating or both can be provided for the detection chamber 117 to further regulate the temperature of the liquid in chamber 117. Shut off valve 92 is used for rapid introduction of liquid to chamber 117, regulator chamber (liquid level regulator chamber) 55 and flame checking chamber 59 prior to operation of the system.

A sensing means in the form of a detection head (detecting unit) 49 is mounted generally above arrester 47 with shroud 50 being positioned to guide the flow of sample gas to detection head 49 and to reduce the relative volume of sample gas needed for rapid detection, especially for rapid detection of concentration changes in the incoming sample gas. The sample gas is analyzed for hydrogen content in the detection chamber 117 by the detection head 49 which is electronically connected by line 75 to an indicating instrument 74. Instrument 74 will electronically give a continuous indication and output reading proportional to the content of the constituent being analyzed in volume percentage in comparison with the total gas volume of the sample gas within the detection chamber 117 at any given instant. A representative detection unit for the detector head 49 is either a standard hot wire unit such as the MSA thermatron unit made by the Mine Safety Appliance Company, a catalytic type unit such as the I-500 series analyzer made by the Mine Safety Appliance Company, or any other suitable detection unit. The hot wire unit measures heat transfer of the gas medium in contact with the wire relative to the atmosphere and gives the cooling effect due to the particular concentration of the gas constituent. By way of specific example, the greater the hydrogen content in the gas being analyzed the greater is the cooling effect. The catalytic unit measures the increased temperature caused by burning the content of the gas constituent being analyzed. By way of specific examples, the greater the hydrogen content in the gas being analyzed, the greater is the temperature due to the burning of hydrogen.

Electrical line 51 is used to connect switches 83, 87, 88, 94, 95, 119 and 123, recorder 118, indicator lights 52, 53 and 96–105, 107 and 108 and the lights are provided at positions visible by plant personnel at various places in the plant to alert them of possible problems with the recombiner as detected in system 40 and can be arranged so that some of the lights come on when a different level of gas concentration is detected. A program timer 89 controls the operating sequence of this system to permit intake of the gases from either lines 37, 112, 85 or 86. Light bulb 106 is connected to temperature switch 121 and liquid filled temperature bulb 120 senses the temperature of liquid 48. Light bulb 106 is actuated when a certain temperature is reached.

Gas inlet line 85 is connected to a source (not shown) of gas containing a predetermined known percentage of the constituent being analyzed by detecting unit 49 for calibration purposes. Gas inlet line 86 is connected to a source (not shown) of a gas free of the constituent being analyzed by detecting unit 49 for zero reference calibration purposes. Line 85 is provided with valves 79 and 80 and line 86 is provided with valve 81 and 82 to control the flow of gas through the lines which merge into line 76 which has flow regulating controller 113. Flame arrester (flame arrester means) 78 is provided submerged under liquid 48 in detection chamber 117 for release of the gas from lines 85 and 86. The flow of gas in lines 85 and 86 can be controlled manually by the control switches 87 and 88 or automatically by a program timer 89 which energizes the switches 87 and 88 and these switches respectively activate solenoid operated valves 80 and 82. Program timer 89 can be set to provide for gas analysis by unit 49 of the gases in lines 85 and 86 at periodic intervals and these calibration gases are conditioned in detection chamber 117 similar to the sample gas from line 37.

The vacuum drawn on the detection chamber 117 for drawing the sample through the system is controlled by regulator valve 68 which is set at any pre-selected condition, for example to enable drawing a vacuum in the range of about 27 to about 30 inches of water. This provides sufficient vacuum for drawing the sample gas into and through the system 40 when the sample gas is at atmospheric pressure or above at the junction of line 37 to line 38.

A pressure indicating switch 84 is provided in this system 40 connected to the sample gas inlet solenoid valves 69, 73, 80, 82 and 115 and vacuum pump 71. This provides a "permissive" condition to open an inlet solenoid valve for a sample gas when a vacuum condition is drawn on the system. This arrangement will also isolate and shut off the sample gas due to vacuum failure, power failure, or loss of vacuum due to other reasons.

A stand pipe (gas-liquid outlet) 54 is provided in the detection chamber 117 to maintain a given liquid level and provide a release of the sample gas and liquid out of detection chamber 117. Overflow liquid in pipe 54 from the detection chamber 117 is collected in the regulator chamber 55 and pipe 54 serves to control the liquid level in detection chamber 117. The liquid level 56 is maintained in the regulator chamber 55 by a float-operated valve 58. When float 57 is raised to a level sufficient to actuate valve (valve means) 58, water is discharged in pipe 61 into the bottom of the flame checking chamber 59. The flame checking chamber 59 contains a predetermined liquid level 60 with overflow liquid passing out of chamber 59 in line 62 through flow glass 63 and valves 64 and 65 to the main condenser (not shown in FIG. 1). The foregoing system provides a liquid cover and cooling effect on the gas in the system preventing explosion along the liquid discharge path from the detection chamber 117 to the main condenser for positive flame and detonation isolation. Due to the fact that lines 67 and 54 are connected to liquid bodies 48, 56 and 60, flame arrest and isolation are also achieved in these lines. The flow glass 63 is provided on the line 62 (a portion of the conduit means connecting a discharge point to the system) leading to the main condenser for visual assurance of sufficient liquid prefill and for visual assurance of a continuous liquid supply being provided to and withdrawn from the system 40. An elevation differential of at least about 30 inches of liquid is maintained between the liquid level 56 in the liquid level regulator chamber 55 and the liquid level 60 in the flame checking chamber 59.

The gas flow from chamber 117 through the rest of the system 40 will be discussed. The sample gases are withdrawn from chamber 117 in line 54 by the vacuum drawn on "tee" connection 66 which enables a gas separation from the liquid with the gas passing in line 67 through a vacuum regulator valve 68 and solenoid operated valve 69 and then to the flame checking chamber 59 with introduction of the gas in small bubbles in chamber 59 through a sintered metal flame arrester (flame arrester means) 70. This separation enables even flow of gas and liquid in system 40 and prevents pressure variation in system 40. When an auxiliary means for drawing a vacuum is necessary, such as when the main condenser vacuum is insufficient to drawn an adequate vacuum, the three-way solenoid valve 69 is energized so that auxiliary vacuum pump 71 in line 72 provides additional vacuum. This draws the gas into line 72 through the valve 73 to line 67 and into the flame checking chamber 59. The gas passes through the same sintered metal flame arrester (flame arrester means) 70 submerged beneath liquid 60.

The system for gas conditioning and analyzing described above has the following functions and advantages. The system 40 provides a constant temperature and liquid content for any sample or calibration gas injected into the detection chamber 117 regardless of the original temperature and liquid content of the sample drawn into chamber 117. This system 40 provides a short response time of generally less than about ten seconds to detect hydrogen concentration changes at the gas sample inlet 38 by the rapid sample conditioning of the sample gases injected into the liquid 48 from the sintered metal flame arrester (flame arrester means) 47 and bubbled up through the liquid 48 to the detection head 49. Further a positive flame detonation arrest and isolation is provided by the liquid level regulator chamber 55 and flame checking chamber 59 for the liquid flow path from the point of withdrawing a gas sample from detection chamber 117 to the discharge point of the system. There is a constant liquid supply in the system 40 through the addition of liquid into the system which provides cooling or heating of the sample gases depending upon the temperature of the incoming gases. Further additional heating or refrigeration can also be provided by heating means or cooling means located either within or around the detection chamber 117 to obtain any desired temperature and humidity conditions for the sample gas.

SUMMARY OF THE INVENTION

It has now been discovered that a gas conditioning and analyzing system capable of analyzing potentially explosive mixtures of sample gases in a safe manner and having even shorter required analytical time can be achieved by using separate outlets from the detection chamber for the gas and the liquid while maintaining the sample gas in contact with liquid at critical locations in the system during the residence of the sample gas in the system in order to isolate and negate the development of explosive conditions in the system. The critical locations generally are those in which any resulting explosion could involve plant shutdowns or potential injuries to personnel.

In addition the gas conditioning and analyzing system has the gas outlet positioned adjacent to the detection unit in the detection chamber so that the gas samples introduced to the detection chamber under liquid are drawn past the detection unit to the gas outlet.

The foregoing improvements provide a gas conditioning and analyzing system having a conduit means connecting the system to a sampling point and a discharge point. The portion of the conduit means connected to the sampling point leads to a detection chamber capable of holding a liquid reservoir. The detection chamber has a detecting unit for gas analysis, a liquid outlet and a gas outlet. The liquid outlet leads to a liquid level regulator chamber having valve means for regulating the liquid level therein, and the gas outlet leads to a flame checking chamber for release of the gas under liquid. The flame checking chamber is connected to a portion of the conduit means leading to a discharge point for release of the gas sample. Vacuum drawing means is provided for drawing the gas through the system.

OBJECTS OF THE INVENTION

Accordingly it is an object of this invention to provide a rapid determination of the presence of a selected component or selected components in a gas composition taken from a gas source in which the gas composition can include potentially explosive mixtures.

Another object of this invention is to provide monitoring of a gas composition at a point upstream and a point downstream of a recombiner in a nuclear reactor and steam supply system. This monitoring of the gas composition before and after the recombiner system can be for hydrogen or oxygen or both and provides a check on the operation and efficiency of the recombiner.

Still another object of this invention is to provide a monitoring system for the gas stream leaving the turbine which receives the steam supply from a nuclear reactor.

A still further object of this invention is to provide a monitoring system for the gas composition at a point upstream and a point downstream of a recombiner which system is able to analyze potentially explosive mixtures of gases in a safe manner.

A further object of this invention is to monitor the containment atmosphere in a nuclear reactor for oxygen and hydrogen content.

Other objects and advantages of this invention will become apparent to the person skilled in the art from reading the following specification, the appended

DETAILED DESCRIPTION OF THE DRAWINGS

Figure 2:
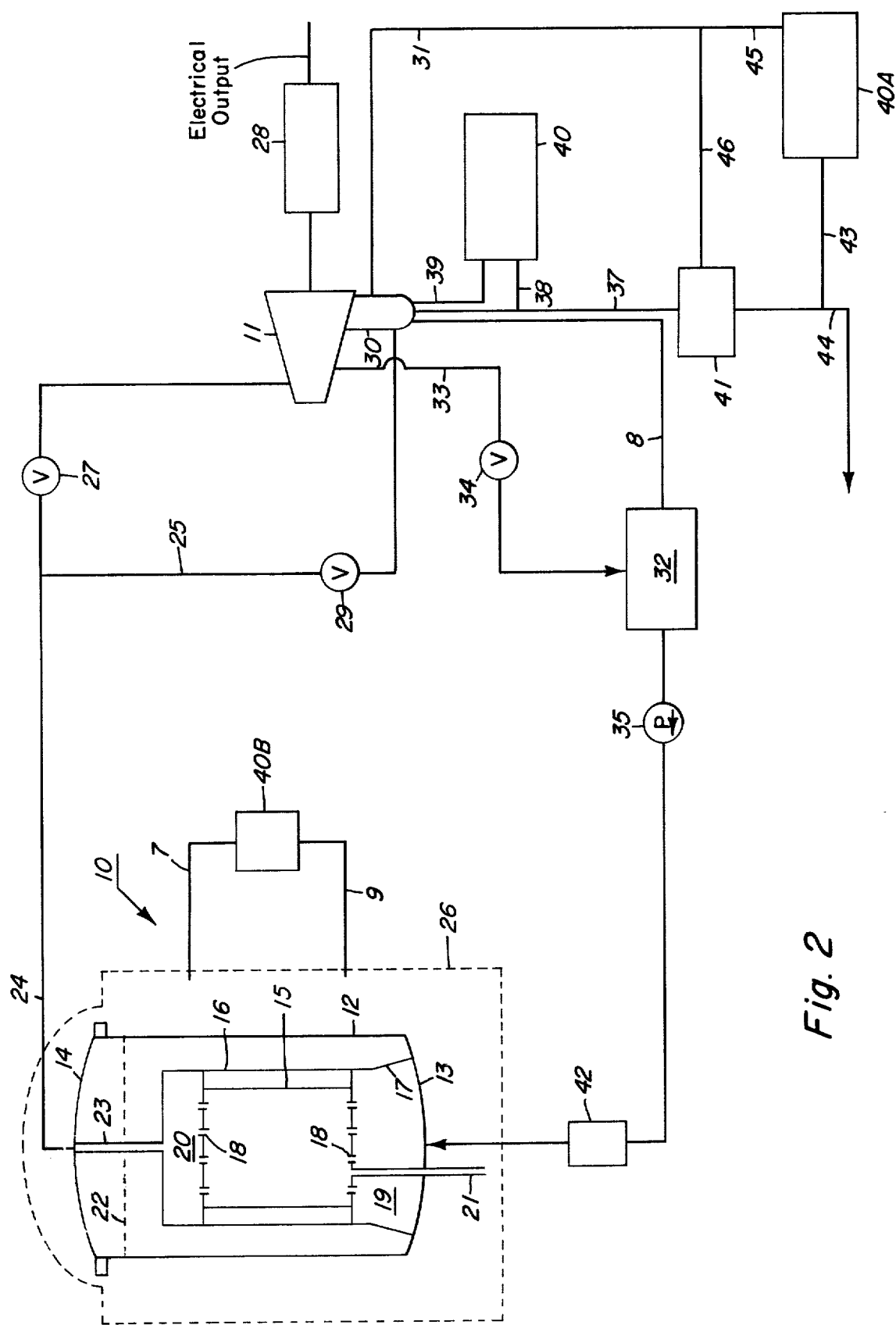
FIG. 2 presents a simple schematic flow sheet for a nuclear power plant incorporating the gas conditioning and analyzing system disclosed in this invention at several locations in the nuclear power plant.

Referring now to FIG. 2, there is shown a simple schematic diagram of a nuclear power plant, including a nuclear reactor generally designated as 10 and housed within containment 26 (shown by a dotted line) which is provided with openings for steam line 24 and return line 8. Reactor 10 as shown here includes a generally cylindrical pressure vessel 12 closed at the bottom by a dish-shaped head 13 and at the top by a removable dome-shaped head 14. A core 15 is located in pressure vessel 12 mounted within a shroud 16 supported by a flaring skirt portion 17. Openings 18 are provided through core 15 to permit passage of coolant therethrough. Coolant enters core 15 from lower inlet plenum 19 and leaves the core 15 going into the upper outlet plenum 20 in the form of steam. Reactivity of core 15, and thus the output of steam, is controlled by control rods 21 entering the core through the bottom of the reactor. Only one control rod 21 is shown for clarity. The annular space between shroud 16 and cylindrical wall 12 of the pressure vessel is filled with water to a level indicated by dashed line 22.

Figure 1:
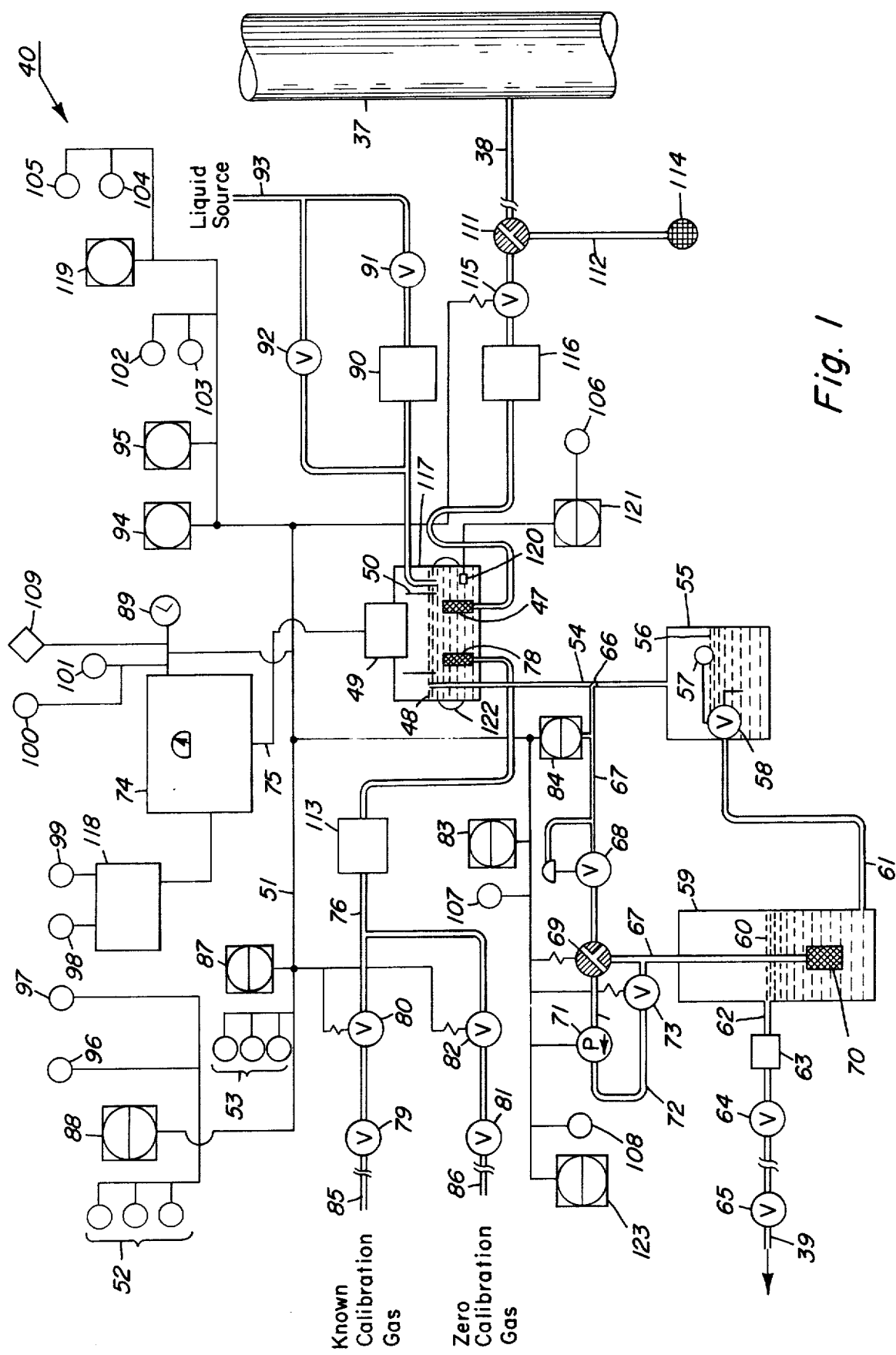
FIG. 1 shows a gas conditioning and analyzing system as disclosed in U.S. Pat. application Ser. No. 178,113 and described above in the Background of the Invention.

During steady state operation of the reactor, steam leaves outlet plenum 20 through riser 23 and steam line 24 entering turbine 11 after passing through valve 27. The steam drives turbine 11, which in turn drives generator 28 to provide electrical output. Steam condensed in turbine 11 leaves in line 33 passing through valve 34 and entering feedwater heater 32. Bypass line valve 29 in bypass line 25 is closed during steady operation. The steam is condensed in main condenser 30 and the condensate is routed back to the reactor 10 in line 8 passing through feedwater heater 32, pump 35 and filter 42 to the reactor inlet plenum while the uncondensed gases pass in line 37 to a recombiner 41 which recombines hydrogen and oxygen into water vapor which is returned to the main condenser 30 in lines 46 and 31 and in turn is condensed in condenser 30. In FIG. 1, one gas conditioning and analyzing system 40 is connected to line 37, which carries gases from the condenser 30 to the recombiner 41, by sample withdrawal line 38 and sample return line 39 is provided for returning the sample to condenser 30.

A second gas conditioning and analyzing system 40A is connected to line 44 by sample withdrawal line 43 for taking a sample leaving recombiner 41 with sample return line 45 being connected to line 31 for returning the sample to condenser 40. The operation of systems 40 and 40A which serve as monitors of the gaseous composition entering and leaving recombiner 41 will be described below.

A third gas conditioning and analyzing system 40B is provided to monitor the gas atmosphere inside the containment 26 with sample withdrawal line 7 and sample return line 9 being used to feed the sample to system 40B. The system 40B is designed to run a continuous monitoring of oxygen and hydrogen during plant operation and shutdown in order to detect any air leaks in the containment 26 as the containment holds an inert atmosphere during reactor operation. Air replaces the inert atmosphere on shutdown to enable personnel to breath during entry into the containment so that monitoring is very important during shutdown.

Figure 3:
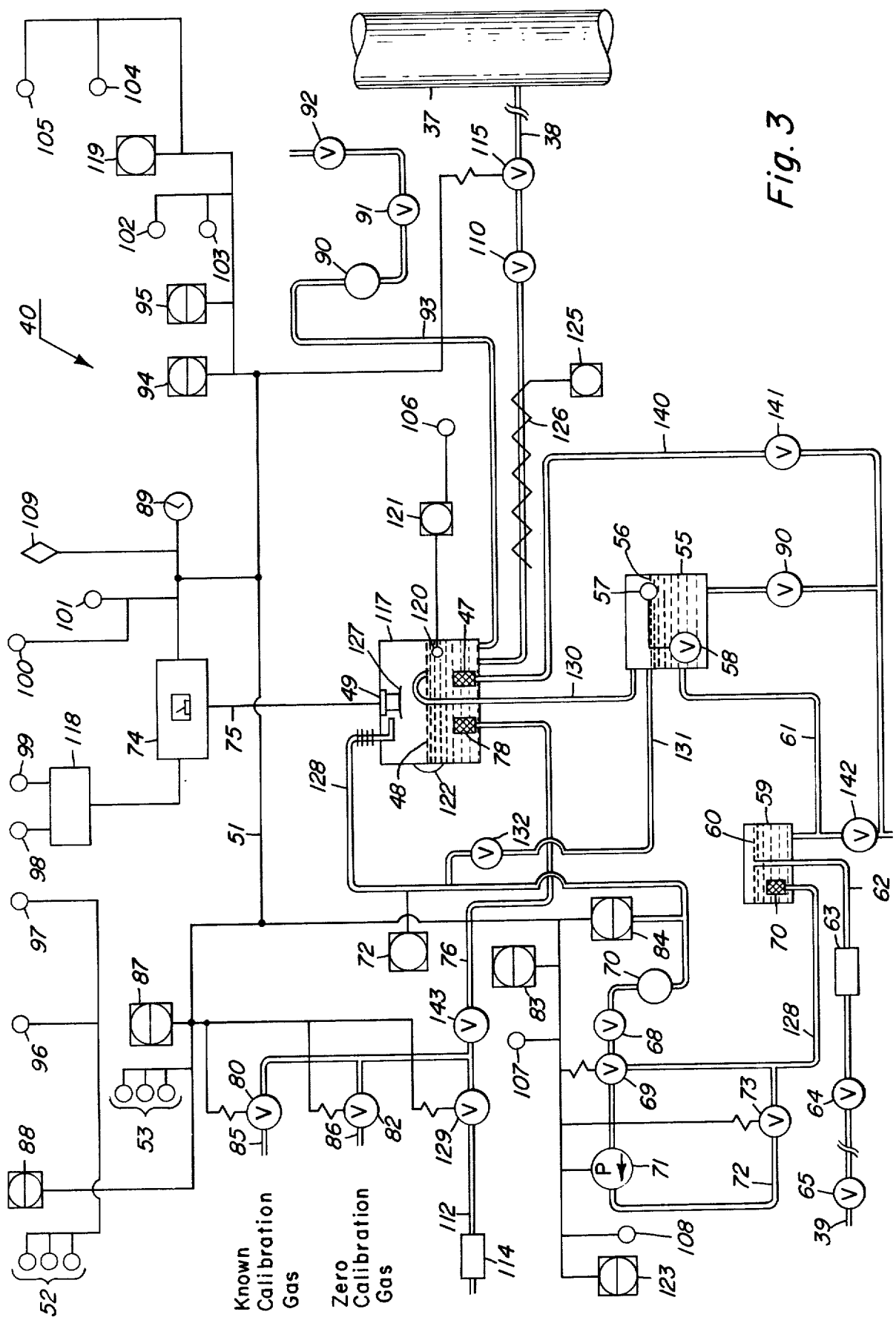
FIG. 3 shows an improved gas conditioning and analyzing system according to the practice of this invention with the system having a detection chamber provided with a separate liquid outlet and a separate gas outlet.

Referring now to FIG. 3 there is shown in greater detail one embodiment of the gas conditioning and analyzing system 40 of this invention with like numbering being used for the same components as in FIG. 1. Samples of gases are withdrawn from the main process stream in line 37 and pumped in line (conduit means connecting a sampling point to the system) 38 into the system by the main condenser vacuum (vacuum drawing means) or by an auxiliary vacuum pump (vacuum drawing means) in the absence of sufficient main condenser vacuum.

The process gas samples pass through solenoid shut off valve 115 and manually operated valve 110. Valve 115 is electrically connected and responsive to switch 94. Valves 115 and 110 can be used to stop any gas in line 38 from being drawn further into the system 40. The rate of flow of sample gas in line 38 is controlled by valve means 110 to a pre-selected flow rate, and the sample gas is passed into sample detection chamber 117 through a sintered porous metal flame arrester 47 which is submerged under a body of liquid 48. The arrester 47 disperses the incoming gas into very small bubbles so that it bubbles up through the liquid giving up or absorbing temperature and liquid which is determined by the temperature of the liquid 48 in the detection chamber 117. The bubbling action further serves to condition the sample in that any particulate matter carried in the sample is picked up by the liquid. A preferred liquid 48 is water when the system 40 is set up to analyze the sample for its hydrogen or oxygen content or both. A heating means 125 with heating element 126 is provided for heating line 38 to prevent any condensation of moisture in line 38 from moisture in the gas sample drawn into line 38.

Liquid 48 is added to detection chamber 117 in line 93 through valves 91 and 92 and flow indicating controller 90 which controls the flow to a predetermined amount of liquid. This maintains sufficient liquid in detection chamber 117 at desired temperature to alter the incoming gas sample to the desired temperature liquid. In this manner the detection chamber 117 controls the temperature of the gas sample. A means 122 of refrigeration or heating or both can be provided for the detection chamber 117 to further regulate the temperature of the liquid in chamber 117. The flow in line 93 can be sufficiently high to enable rapid pre-filling of chamber 117, regulator chamber (liquid level regulator chamber) 55 and flame checking chamber 59 with liquid prior to operation of the system.

A detection unit (or units) in the form of a detection head 49 (or multiple detection heads) is mounted generally above arrester 47 with splash shield 127 being provided to protect detection head 49 from splases of liquid. A separate gas outlet line (gas outlet) 128 enters the top of chamber 117 and draws the gas introduced to detection chamber 117 from flame arrester 47 past detection head 49 and into the gas outlet 128. This reduces the volume of sample gas needed for rapid detection, especially for rapid detection of concentration changes in the incoming sample gas. The sample gas is analyzed for the content of a given gaseous element in the detection chamber 117 by the detection head 49 which is electronically connected by line 75 to an indicating instrument 74. Instrument 74 will electronically give a continuous indication and output reading proportional to the content of the given gaseous element being analyzed in volume percentage in comparison with the total gas volume of the sample gas within the detection chamber 117 at any given instant. A representative detection unit for the detection head 49 is either a standard hot wire unit such as the MSA thermatron unit made by the Mine Safety Appliance Company, a catalytic type unit such as the I-500 series analyzer made by the Mine Safety Appliance Company, an electronchemical unit made by General Electric Company or any other suitable detection unit. The hot wire unit measures heat transfer of the gas medium in contact with the wire relative to the atmosphere and gives the cooling effect due to the particular concentration of the gas constituent. By way of specific example, the greater the hydrogen content in the gas being analyzed the greater is the cooling effect. The catalytic unit measures the temperature created by burning the content of the gas constituent being analyzed. By way of specific example, the greater the hydrogen content in the gas being analyzed, the greater is the temperature due to the burning of hydrogen. The electrochemical unit measures gas content by a chemical reaction of the gas being analyzed with an electrolyte which produces an electrical current proportional to the content of analyzed gas within the immediate vicinity of the detector.

Electrical line 51 is used to connect switches 83, 87, 88, 94, 95, 119 and 123, recorder 118, indicator lights 52, 53 and 96–105, 107 and 108 (which are provided at positions visible by plant personnel at various places in the plant to alert them of possible problems and can be arranged for certain lights to come on when the system detects different concentrations of the gas being analyzed) and a program timer 89 which controls the operating sequence of this system to permit intake of the gases from either lines 37, 85 or 86. Light bulb 106 is connected to temperature switch 121 and liquid filled temperature bulb 120 which senses the temperature of liquid 48. Light bulb 106 is actuated when a certain selected temperature is reached. Alarm means 109 is provided in line 51 and is activated upon the occurrence of a certain gas concentration as detected by system 40.

Gas inlet line 85 is connected to a source (not shown) of gas containing a predetermined known percentage of a given gaseous constituent (e.g., hydrogen, oxygen, etc.) for calibration purposes and this is referred to as "known concentration gas source." Air inlet line 112 is provided to permit air to pass through filter 114 and valves 129 and 143 and line 76 to flame arrester 78. Gas inlet line 86 is connected to a source (not shown) of a gas free of the given gaseous constituent (e.g., hydrogen, oxygen, etc.) for zero calibration purposes and this is referred to as "zero calibration source." Line 85 is provided with valve 80 and line 86 is provided with valve 82 to control the flow of gas through the lines which merge into line 76. Flame arrester 78 is provided submerged under liquid 48 in detection chamber 117 for release of the gas from lines 85, 86 and 112. The flow of gas in lines 85, 86 and 112 is controlled manually by the control switches 87 and 88 or automatically by program timer 89 which energizes the switches which in turn operate the solenoid operated valves 80, 82 or 129. Program timer 89 provides for calibration checks with gases from lines 85 and 86 at periodic intervals during which these calibration gases are sample conditioned in detection chamber 117 to the approximately exact temperature and liquid content as is practiced for the sample gas from line 37.

The vacuum drawn on the detection chamber 117 for drawing the sample through the system is controlled by regulator valve 68 which is set at any pre-selected condition, for example a vacuum in the range of about 27 to about 30 inches of water. This proves sufficient for drawing the sample gas into and through the system 40 when the sample gas is at atmospheric pressure or above at the junction of line 37 to line 38. This enables maintaining a steady flow of the sample gas into detection chamber 117.

A pressure indicating switch 84 is provided in this system 40 connected to the sample gas inlet solenoid valves 69, 73 and vacuum pump 71. This provides a "permissive" condition to open an inlet solenoid valve for a sample gas when a vacuum condition is drawn on the system. This will also isolate and shut off the sample gas in the event of power failure or loss of vacuum in the system.

A liquid outlet (pipe) 130 is provided in the detection chamber 117 to maintain a given liquid level and provide a line for release of liquid from detection chamber 117. Liquid outlet 130 controls the liquid level in detection chamber 117 and liquid from liquid outlet 130 is collected in the regulator chamber 55. The liquid level 56 is maintained in the regulator chamber 55 by a float-operated valve (valve means) 58. When float 57 is raised to a level sufficient to actuate valve 58, liquid is discharged in pipe 61 which leads to the bottom of the flame checking chamber 59. The flame checking chamber 59 contains a liquid level 60 with overflow liquid passing out of chamber 59 in line 62 (conduit means connecting the system to a discharge point) through flow glass 63 and valves 64 and 65 to the main condenser 30 (not shown in FIG. 3). A line 131 is provided to vent air entrapped in regulator chamber 55 when water is initially introduced thereto. The foregoing system provides a liquid cover and cooling effect on the sample gas in the system preventing explosion along the water discharge path from the detection chamber 117 to the main condenser 30 for positive flame and detonation isolation. Due to the fact that line 128 runs between detection chamber 117 containing liquid body 48 and flame checking chamber 59 containing liquid body 60, flame arrest and isolation are also achieved in this line. The flow glass 63 is provided on the line 62 leading to the main condenser for visual assurance of sufficient water pre-fill and for visual assurance of a continuous liquid supply being provided to and withdrawn from the system 40. An elevation differential of at least about 30 inches of liquid is maintained between the valve 58 at the connection to line 61 for the liquid level regulator chamber 55 and liquid level 60 in the flame checking chamber 59.

Having completed the discussion of the liquid flow in system 40, the gas flow from chamber 117 through the rest of the system 40 will be discussed. The sample gases are withdrawn from chamber 117 in line 128 by the vacuum drawn on line 128 which enables a gas separation from the liquid in the detection chamber with the gas passing in line 128 through gas flow indicator 70, vacuum regulator valve 68 and solenoid operated valve 69 and then to the flame checking chamber 59 with introduction of the gas in small bubbles in chamber 59 being through a sintered metal flame arrester 70. This separation of the liquid from the gas upon withdrawal from detection chamber 117 enables even flow of gas and liquid in system 40 and prevents pressure variation in system 40. When an auxiliary vacuum is necessary, such as when the main condenser vacuum is insufficient to provide adequate vacuum, the three-way solenoid valve 69 is energized so that auziliary vacuum pump 71 in line 72 provides additional vacuum. This draws the gas into line 72 through the valve 73 into the flame checking chamber 59. The gas passes through the same sintered metal flame arrester 70 submerged beneath liquid 60.

Figure 4:
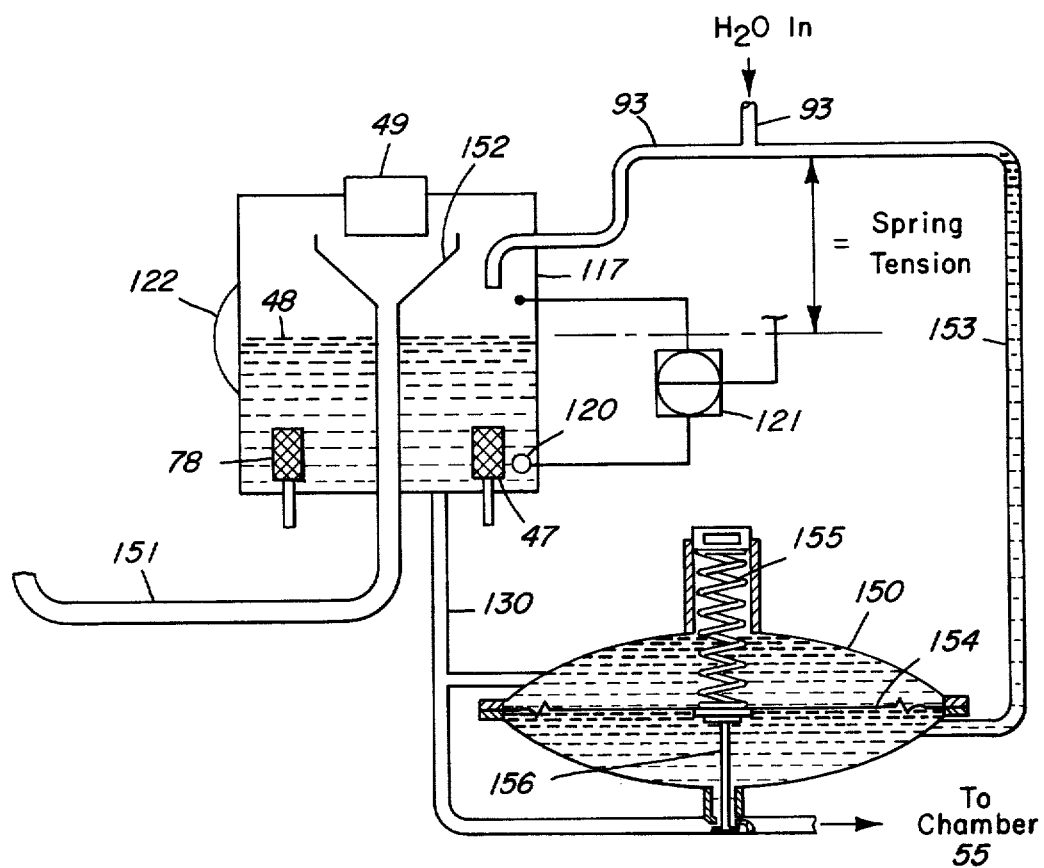
FIG. 4 presents a detailed drawing of another embodiment of a portion of the gas conditioning and analyzing system showing the detection chamber and valve means serving to regulate the liquid level in the detection chamber.

Another embodiment of the separate gas and liquid outlets from the detection chamber 117 is shown in FIG. 4 along with a liquid valve 150 for regulating the liquid withdrawn from detection chamber 117. Here separate gas outlet 151 has an expanded funnel portion 152 serving to protect detection head (detection unit) 49 from splashing of liquid 48 as gas is released from either flame arrester 78 or flame arrester 47. As the gas rises from either flame arrester 47 or 78 in small bubbles, it is drawn into funnel portion 152 and gas outlet 151 past detection head 49 by the vacuum drawn on the system. Liquid inlet line 93 has a loop 153 for feeding liquid through valve 150, which includes a diaphram 154, spring 155 and rod 156, into an outlet (line) 130. The spring 155 has tension set equal to the difference in liquid head pressure between the liquid level in loop 153 and the liquid level 48 in detection chamber 117. Liquid outlet 130 has a slow feed of liquid out of the bottom of detection chamber 117 which is controlled by the portion of rod 156 in liquid outlet 130.

Figure 5:
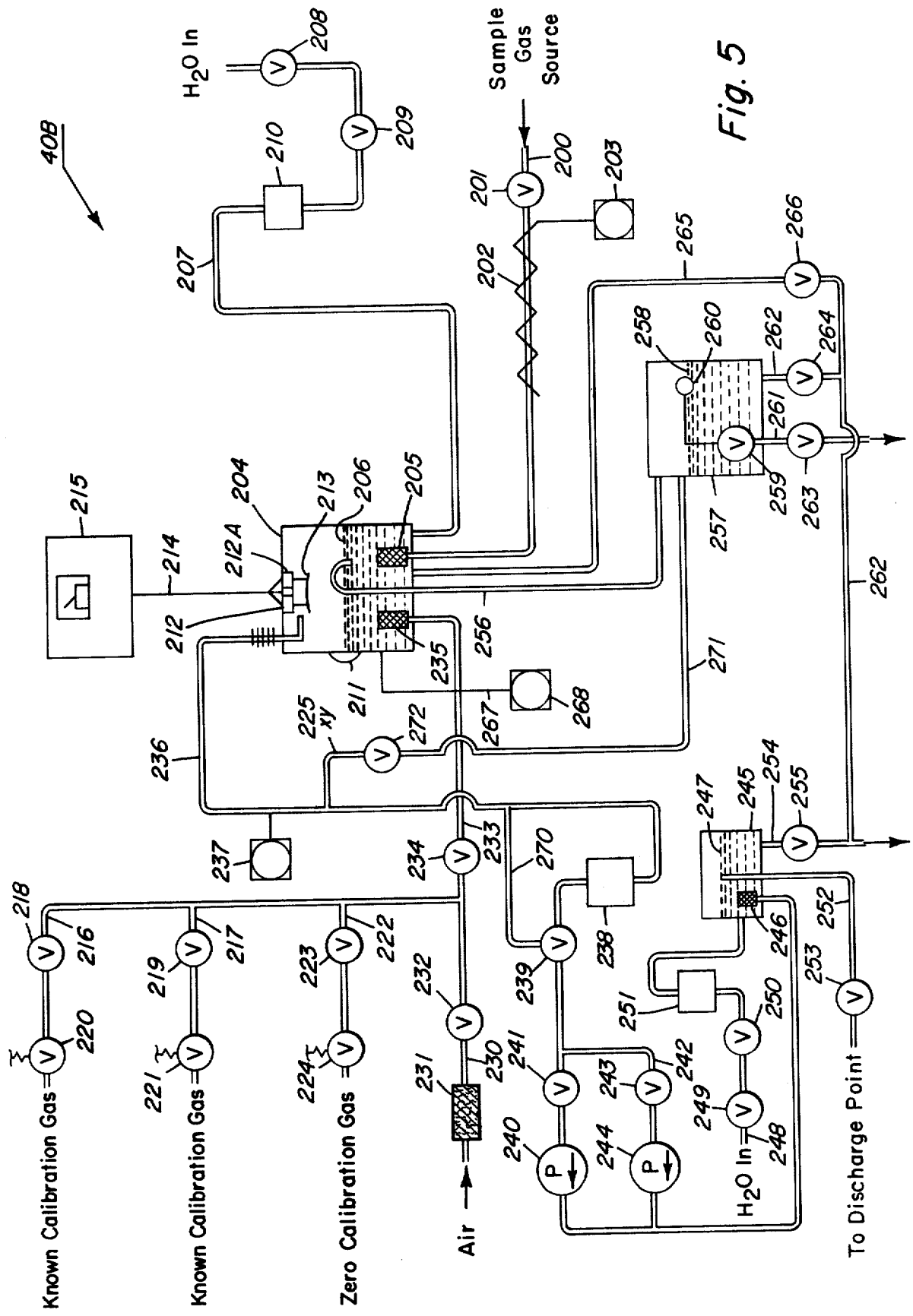
FIG. 5 shows an improved gas conditioning and analyzing system according to the practice of this invention with the system having a detection chamber provided with a separate liquid outlet and a separate gas outlet.

Referring now to FIG. 5 there is shown another embodiment of the gas conditioning and analyzing system of this invention particularly adapted for position 40B in FIG. 2 for monitoring the gas within the containment 26. Samples of gases are withdrawn from a source (not shown) in line 200 into the system 40B by a vacuum drawing means (vacuum pump).

The sample gas passes through inlet valve 201 and through the portion of line 200 surrounded by heating element 202 which receives energy from heating means 203. Valve 201 can be used to stop any gas from passing through line 200 to detection chamber 204. The gas sample is released in detection chamber 204 through a sintered porous metal flame arrester 205 which is submerged under a body of liquid 206. The arrester 205 disperses the incoming gas into very small bubbles so that it bubbles up through the liquid 206 giving up or absorbing temperature and liquid which is determined by the temperature of the liquid 206 in the detection chamber 204. The bubbling action further serves to condition the sample in that any particular matter carried in the sample is picked up by the liquid 206. A preferred liquid 206 is water when the system 40B is set up to analyze the sample for its hydrogen content, oxygen content or both.

Liquid 206 is added to detection chamber 204 in line 207 and line 207 has valves 208 and 209 and flow indicating controller 210 which permits a predetermined amount of liquid to detection chamber 204. This maintains sufficient liquid in detection chamber 204 at desired temperatures to alter the incoming gas sample to the desired temperature. In this manner the detection chamber 204 controls the temperature of the gas sample. A temperature control means 211 for heating or cooling or both can be provided for the detection chamber 204 to further regulate the temperature of the liquid 206 in chamber 204.

A sensing means in the form of detection heads (detection units) 212 and 212A are mounted generally above arrester 205 with splash guard 213 being positioned to protect detection heads 212 and 212A from splasing liquid from liquid 206 due to the release of gas from arrester 205. The sample gas is analyzed for content of the selected gases in the detection chamber 204 by the detection heads 212 and 212A which are electronically connected by line 214 to an indicating instrument 215. Instrument 215 will electronically give a continuous indication and output reading proportional to the content of the selected gases being analyzed in volume percentage in comparison with the total gas volume of the sample gas within the detection chamber 204 at any given instant. Representative detection units for the detector heads 212 and 212A are either standard hot wire units such as the MSA thermatron unit made by the Mine Safety Appliance Company, a catalytic type unit such as the I-500 series analyzer made by the Mine Safety Appliance Company, a hydrogen or oxygen sensitive electrochemical detection unit made by General Electric Company, or any other suitable detection unit. The hot wire unit measures heat transfer of the gas medium in contact with the wire relative to the atmosphere and gives the cooling effect due to the particular concentration of the gas constituent. By way of specific example, the greater the hydrogen content in the gas being analyzed the greater is the cooling effect. The catalytic unit measures the temperature created by burning the content of the gas constituent being analyzed. By way of specific example, the greater the hydrogen content in the gas being analyzed, the greater is the temperature due to the burning of hydrogen. The electrochemical unit measures the analyzed gas content by a chemical reaction of the analyzed gas with an electrolyte which produces an electrical current proportion to the content of the analyzed gas within the immediate vicinity of the detection unit.

Gas inlet lines 216 and 217 are each connected to a separate source (not shown) of gas containing a predetermined known percentage of a gaseous constituent for calibration purposes for that particular constituent. Valves 218 and 220 are provided in line 216 and valves 221 are provided in line 217 and these valves are provided for controlling the gas flow in lines 216 and 217.

Gas inlet line 222 is connected to a source (not shown) of a gas free of the constituents in lines 216 and 217 and is used as a gas for zero reference calibration purposes. Line 222 has valves 223 and 224 provided for controlling the flow of gas in line 222. Line 230 is provided for feeding air through filter 231 and valve 232. Lines 216, 217, 222 and 230 are connected to line 233 having valve 234 and line 233 enters detection chamber 204 and terminates with flame arrester 235. Flame arrester 235 is provided submerged under liquid 206 in detection chamber 204 for release of the gas from lines 216, 217, 222 and 230 so that the gas is in the form of small bubbles. These calibration gases are sample conditioned in detection chamber 117 to the approximately exact temperature as is practiced for the sample gas from line 200.

The gas sample drawn into detection chamber 204 is removed in gas outlet 236 which is inserted inside detection chamber 204 adjacent detection units 212 and 212A. The gas outlet 236 has a pressure indicator switch 237 and a flow indicator means 238 located upstream of a three-way pressure regulator valve 239 which regulate the amount of vacuum drawn on gas outlet 236. An auxiliary line 270 is provided when it is desired to bypass flow indicator means 238. Gas outlet 236 has vacuum drawing means (vacuum pump) 240 and valve 241, and auxiliary line 242 has another vacuum drawing means (vacuum pump) 244 and valve 243 which can be used as a back-up unit for means 240 or as additional vacuum drawing capacity. Gas outlet 236 enters flame checking chamber 245 and is connected to a flame arrester (flame arrester means) 246 which is submerged under liquid 247. In this manner the gas is bubbled into the flame checking chamber 245 under liquid. Line 248 has valves 249 and 250 and leads from a liquid source (not shown) to reservoir 251 and ultimately to flame checking chamber 245. A liquid discharge line 252 with valve 253 serves as a conduit means connecting a discharge point to the system 40B and leads from the flame checking chamber 245 to the discharge point (not shown). Line 252 carries the gas and liquid from the flame checking chamber 245 to the discharge point. An additional discharge line 254 with valve 255 is provided for rapid removal of liquid from the flame checking chamber 245.

The liquid outlet 256 in detection chamber 204 is a pipe with a curved portion and serves to define the liquid level in detection chamber 204. Liquid outlet 256 leads to regulator chamber 257, and the water level 258 is maintained in the regulator chamber 257 by a float-operated valve 259. When float 260 is raised to a level sufficient to actuate valve 259, water is discharged in pipe 261 through valve 263 to a drain (not shown). An additional line 262 having shut off valve 264 is provided for rapid removal of the liquid 258 to the drain for the flame checking chamber 245 (not shown). An additional line 265 with shut off valve 266 is provided for rapid removal of the liquid 206 from detection chamber 204. Regulator chamber 257 is vented by line 271 through a valve 272 to line 236 to release displaced air when regulator 257 is first filled with liquid from line 256.

The foregoing embodiment of this invention provides a water cover and cooling effect on the gas in the system preventing explosion along the gas discharge patch from the detection chamber 204 to the discharge point for positive flame and detonation isolation.

The embodiments of the system for gas conditioning and analyzing described above have the following functions and advantages. The system 40 provides a constant pressure and temperature and liquid environment for any sample or calibration gas injected into the detection chamber 117 regardless of the original gas pressure, temperature and humidity of the sample drawn into chamber 117. This system 40 provides a short response time of generally less than about ten seconds to detect concentration changes in the sample gas by the rapid sample conditioning of the sample gas injected into the detection chamber from the flame arrester means and bubbled up through the liquid to the detection head. Further a positive flame detonation arrest and isolation is provided by the liquid level regulator chamber and flame checking chamber for the liquid flow path from the point of withdrawing a gas sample to the point of discharge of the sample.

The embodiments of the system of this invention also provide for more rapid detection of changes in the sample gas through providing a separate gas outlet and by positioning the intake portion of the gas outlet means adjacent to the detection unit.

While this system has been described for a preferred utility with a nuclear chain fission reactor and connected apparatus for hydrogen or oxygen analysis or both with the fluid in the system being water, this system can be adapted to many other applications where it is difficult to obtain consistent, reliable and safe gas analysis of wet or dry volumes of gas.

As will be apparent to those skilled in the art, various modifications and changes may be made in the system and apparatus described herein. It is accordingly the intention that the invention be construed in the broadest manner within the spirit and scope as set forth in the accompanying claims.

What is claimed is:

1. A gas conditioning and analyzing system comprising, in combination,
   a. conduit means connecting the system to a sampling point and a discharge point, the sampling point being connected by the conduit means to
   b. a detection chamber capable of holding a liquid reservoir for receiving a gas sample from the conduit means and having a detecting unit for gas analysis and a gas outlet and a liquid outlet, the liquid outlet directing the liquid to
   c. a liquid level regulator chamber having valve means for regulating the liquid level therein, and the gas outlet directing the gas to
   d. a flame checking chamber for release under liquid, the flame checking chamber being connected to the conduit means leading to the discharge point, and
   e. vacuum drawing means for drawing the gas sample through the system.

2. A gas conditioning and analyzing system of claim 1 in which the detection chamber holds a liquid and the liquid is water.

3. A gas conditioning and analyzing system of claim 2 in which the gas sample is introduced to the detection chamber through a flame arrester means submerged under liquid.

4. A gas conditioning and analyzing system of claim 1 in which the detecting unit is capable of detecting a gas selected from the group consisting of hydrogen, oxygen and hydrogen oxygen in a mixture thereof.

5. A gas conditioning and analyzing system of claim 1 in which the detecting unit in the detection chamber is a catalytic unit.

6. A gas conditioning and analyzing system of claim 1 in which the detecting unit in the detection chamber is a hot wire unit.

7. A gas conditioning and analyzing system of claim 1 in which the detecting unit in the detection chamber is an electrochemical unit.

8. A gas conditioning and analyzing system of claim 1 in which a source of calibration gas of known concentration and a source of analyzed free calibration gas are capable of being selectively introduced into the detection chamber through a flame arrester means submerged under the liquid.

9. A gas conditioning and analyzing system of claim 1 in which the flame checking chamber has a flame arrester under liquid receiving the gas to be released in the flame checking chamber.

10. A gas conditioning and analyzing system of claim 1 which is connected to a line receiving the gaseous discharge from a main condenser in a nuclear steam supply system.

11. A gas conditioning and analyzing system of claim 1 which is connected to a line receiving the gaseous discharge from a recombiner unit in a nuclear steam supply system.

12. A gas conditioning and analyzing system of claim 1 having a splash guard mounted in the detection chamber between the detecting unit and the liquid reservoir.

13. A gas conditioning and analyzing system of claim 1 in which the gas outlet has a funnel shaped opening located adjacent the detecting unit and serving to shield the detecting unit from splashing of liquid.

14. A gas conditioning and analyzing system of claim 1 in which the detecting unit is capable of analyzing for hydrogen and oxygen.

15. A gas conditioning and analyzing system of claim 1 in which the conduit means connecting the system to a sampling point is heated by heating means.

16. A gas conditioning and analyzing system of claim 1 in which the gas outlet is adjacent and detecting unit.

17. A gas conditioning and analyzing system of claim 1 in which a water valve is used to regulate the liquid reservoir in the detection chamber.

18. A gas conditioning and analyzing system comprising, in combination,
 a. conduit means connecting a sampling point to a first flame arrester means, the flame arrester means being enclosed within
 b. a detection chamber capable of holding a liquid reservoir and having a detecting unit for gas analysis, a gas outlet and a liquid outlet, the liquid outlet directing the liquid in the detection chamber to
 c. a liquid level regulator chamber having valve means for regulating the liquid level therein and the gas outlet directing the gas to
 d. a flame checking chamber for release under liquid through a second flame arrester means, the flame checking chamber receiving liquid from the regulator chamber,
 e. a conduit means connecting the flame checking chamber to a point for discharge of the gas, and
 f. vacuum drawing means for drawing the sample gas through the system.

19. A gas conditioning and analyzing system of claim 18 in which the liquid is water.

20. A gas conditioning and analyzing system of claim 18 in which the detecting unit is capable of detecting a gas selected from the group consisting of hydrogen, oxygen and hydrogen and oxygen in a mixture thereof.

21. A gas conditioning and analyzing system of claim 18 in which the detecting unit in the detection chamber is a catalytic unit.

22. A gas conditioning and analyzing system of claim 18 in which the detecting unit in the detection chamber is a hot wire unit.

23. A gas conditioning and analyzing system of claim 18 in which the detecting unit in the detection chamber is an electrochemical unit.

24. A gas conditioning and analyzing system of claim 18 in which a source of calibration gas of known analyzed concentration and a source of analyzed free calibration gas are capable of being selectively introduced into the detection chamber through a third flame arrester means submerged under liquid.

25. A gas conditioning and analyzing system of claim 18 which is connected to a line receiving the gaseous discharge from a main condenser in a nuclear steam supply system.

26. A gas analyzer and conditioning system of claim 18 which is connected to a line receiving the gaseous discharge from a recombiner unit.

27. A gas analyzer and conditioning system of claim 18 which has temperature control means regulating the temperature of the detection chamber.

28. A gas conditioning and analyzing system of claim 18 having a splash guard mounted in the detection chamber between the detecting unit and the liquid reservoir.

29. A gas conditioning and analyzing system of claim 18 in which the gas outlet has a funnel shaped opening located adjacent the detecting unit and serving to shield the detecting unit from splashing liquid.

30. A gas conditioning and analyzing system of claim 18 in which the detecting unit is capable of analyzing for hydrogen and oxygen.

31. A gas conditioning and analyzing system of claim 18 in which the conduit means connecting the system to a sampling point is heated by heating means.

32. A gas conditioning and analyzing system of claim 18 in which the gas outlet is adjacent the detecting unit.

33. A gas conditioning and analyzing system of claim 18 in which a water valve is used to regulate the liquid reservoir in the detection chamber.

34. The method for conditioning and analyzing a gas sample comprising the steps of
 a. introducing the gas sample to a detection zone for release under a liquid of desired conditions,
 b. analyzing the sample gas introduced to the detection zone for the concentration of a selected constituent,
 c. withdrawing the gas from the detection zone to a flame checking zone,
 d. withdrawing the liquid from the detection zone to a regulator zone that regulates the liquid level in the detection zone,
 e. discharging the gas from the flame checking zone to a discharge point and,
 f. discharging the liquid from the regulator zone to a drain.

35. The method of claim 34 in which the liquid is water.

36. The method of claim 34 in which the gas analysis is for a gas selected from the group consisting of hydrogen, oxygen and mixtures thereof.

37. The method of claim 34 in which the analyzing step is conducted by using a catalytic analysis.

38. The method of claim 34 in which the analyzing step is conducted by using a hot wire analysis.

39. The method of claim 34 in which the analyzing step is conducted by using an electrochemical analysis.

40. The method of claim 34 wherein a prior calibration step is conducted using a source of known calibration gas and a source of calibration gas free of the selected constituent.

41. The method of claim 34 in which the gas sample is drawn from the gaseous discharge of a main condenser in a nuclear steam supply system.

42. The method of claim 34 in which the gas sample is drawn from the gaseous discharge of a recombiner unit in a nuclear steam supply system.

43. The method of claim 34 in which the gas sample is drawn from the containment of a nuclear steam supply system.

* * * * *